United States Patent
Moran et al.

(10) Patent No.: US 11,461,031 B1
(45) Date of Patent: Oct. 4, 2022

(54) NON-DISRUPTIVE STORAGE VOLUME MIGRATION BETWEEN STORAGE CONTROLLERS

(71) Applicant: INTERNATIONAL BUSINESS MACHINES CORPORATION, Armonk, NY (US)

(72) Inventors: Timothy Andrew Moran, Southampton (GB); Christopher Bulmer, Kings Worthy (GB); Christopher Canto, Winchester (GB); Warren Hawkins, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/304,464

(22) Filed: Jun. 22, 2021

(51) Int. Cl.
*G06F 3/06* (2006.01)
*G06F 13/40* (2006.01)

(52) U.S. Cl.
CPC .......... *G06F 3/0647* (2013.01); *G06F 3/0604* (2013.01); *G06F 3/0644* (2013.01); *G06F 3/0664* (2013.01); *G06F 3/0683* (2013.01); *G06F 13/4022* (2013.01)

(58) Field of Classification Search
CPC .... G06F 3/0604; G06F 3/0644; G06F 3/0647; G06F 3/0664; G06F 3/0683; G06F 13/4022
See application file for complete search history.

(56) References Cited

U.S. PATENT DOCUMENTS

| | | | |
|---|---|---|---|
| 9,460,028 B1 | 10/2016 | Raizen | |
| 10,782,889 B2 | 9/2020 | Jin | |
| 10,852,980 B1* | 12/2020 | Specht | G06F 3/0647 |
| 2015/0142999 A1 | 5/2015 | Ozoe | |
| 2017/0329714 A1* | 11/2017 | Jin | G06F 3/067 |
| 2019/0332609 A1 | 10/2019 | Shetty | |
| 2020/0133584 A1 | 4/2020 | Tylik | |
| 2020/0348872 A1* | 11/2020 | Tylik | G06F 3/0647 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Eric T Oberly
(74) *Attorney, Agent, or Firm* — L. Jeffrey Kelly

(57) ABSTRACT

A migration replication relationship for data migration between a migration-source volume on a first storage controller and a migration-target volume on a second storage controller, a volume represents a virtualized device. The method presents the migration-source volume and the migration-target volume as a same volume to a host whilst using differentiated target port descriptors to define different discoverable paths to the each. During data migration, the method allows input/output operations to the migration-source volume by presenting target ports of the first storage controller in an available state and deters input/output operations to the migration-target volume by presenting target ports on the second storage controller in a standby state whilst allowing host discovery of paths to the migration-target volume. Once the data migration is complete, the method switches target port states to allow input/output operations to the migration-target volume and to deter input/output operations to the migration-source volume.

25 Claims, 10 Drawing Sheets

(56) References Cited

U.S. PATENT DOCUMENTS

2020/0356287 A1 11/2020 Tylik
2020/0401546 A1* 12/2020 Mehta ................... G06F 13/124
2021/0042045 A1* 2/2021 Tatara ................... G06F 3/0653

* cited by examiner

NON-DISRUPTIVE STORAGE VOLUME MIGRATION BETWEEN STORAGE CONTROLLERS

BACKGROUND

The present invention relates to storage systems, and more specifically, to non-disruptive storage volume migration between storage controllers.

Small Computer System Interface (SCSI) is a set of standards for physically connecting and transferring data between computers and peripheral devices. The SCSI standards define commands, protocols, electrical, optical, and logical interfaces. The SCSI standard defines command sets for specific peripheral device types. SCSI is most commonly used for hard disk drives and tape drives.

A storage controller in a storage network provides block virtualization of storage to provide separation of logical storage from physical storage so that it may be accessed without regard to physical storage or heterogeneous structure. This separation allows the administrators of the storage system greater flexibility in how they manage storage for end users. A logical unit number (LUN) is a number used to identify a logical unit, which is a device addressed by the SCSI protocol or by Storage Area Network protocols that encapsulate SCSI, such as Fibre Channel or iSCSI.

A volume or logical drive is a single accessible storage area with a single file system, typically (though not necessarily) resident on a single partition of a hard disk. Although a volume might be different from a physical disk drive, it can still be accessed with an operating system's logical interface.

Users need to migrate volumes from one storage controller to another in order to balance workloads or to migrate to new storage controller hardware. Often, this can only be done disruptively by making the volumes unavailable for host input/output operations (I/O) while the migration takes place.

An existing volume migration technique is a metro mirror relationship that will synchronize a second copy of the volume on a second system to the first copy of the volume on a first system. The target volume appears as a different volume, and the host must be reconfigured to use this new volume rather than the source. This requires I/O to be interrupted.

Other data migration techniques are host-based solutions. Applications run on hosts, which initialize and control the data migration. An initial copy phase reads the data from the source and writes it to the target, then iterative refresh phases perform the same operation on any further updates to the source that occurred during the copy phase. When synchronization is achieved, a volume PO redirect phase redirects any further I/O from the source to the target.

SUMMARY

According to an aspect of the present invention there is provided a computer-implemented method for non-disruptive volume migration between storage controllers, including creating a migration replication relationship for data migration between a migration-source volume on a first storage controller and a migration-target volume on a second storage controller, where a volume represents a virtualized device, presenting the migration-source volume and the migration-target volume as a same volume to a host whilst using differentiated target port descriptors to define different discoverable paths to the migration-source volume and the migration-target volume, during the data migration, allowing input/output operations to the migration-source volume by presenting target ports of the first storage controller in an available state and deterring input/output operations to the migration-target volume by presenting target ports on the second storage controller in a standby state whilst allowing host discovery of paths to the migration-target volume, and once the data migration is complete, switching target port states to allow input/output operations to the migration-target volume and to deter input/output operations to the migration-source volume.

This has the advantage of migrating data from a volume on a first storage controller to a volume on a second storage controller and switching host input/output operations seamlessly and non-disruptively to the volume on the second storage controller once migration is complete.

Creating the migration replication relationship may include copying a volume identifier from the migration-source volume to the migration-target source volume, such that the migration-target volume and the migration-source volume respond to commands to identify the volumes with the same volume identifier.

Creating the migration replication relationship may include coordinating between the first and second storage controllers so that the migration-source volume and the migration-target volume identify target port groups and relative port identifiers that do not clash.

Deterring input/output operations to the migration-target volume may include failing any received input/output operations at the migration-target volume.

The method may include detecting or receiving confirmation that a host has detected the target ports on the second storage controller before switching port states. The method may automatically switch target port states on detecting or receiving confirmation of completion of the data migration.

The method may include raising an asymmetric access state changed unit attention to a host to alert the host to changes to the states that result in a switch of input/output operations from the migration-source volume to the migration-target volume. The method may include, once the data migration is complete, temporarily pausing input/output operations to the volume to ensure that the migration-source volume and the target-source volume are consistent. The method may include automatically unmapping hosts from the migration-source volume on detecting or receiving confirmation of completion of the data migration.

Deterring input/output operations to the migration-source volume once the data migration is complete, may include switching ports on the first storage controller to a standby state or removing paths to the migration-source volume on detecting or receiving confirmation that the migration is successful.

Switching the target port states may switch the state of all volumes in a consistency group at the same time.

According to another aspect of the present invention there is provided a computer-implemented method for non-disruptive volume migration between storage controllers, including creating a migration replication relationship for data migration between a migration-source volume on a first storage controller and a migration-target volume on a second storage controller, where a volume represents a virtualized device, configuring metadata of the migration-target volume to present the migration-source volume and the migration-target volume as a same volume to a host whilst using differentiated target port descriptors to define different discoverable paths to the migration-source volume and the migration-target volume, promoting discovery of migration-target volume using the discoverable paths, and coordinating input/output operation access during the data migration using asymmetric access states for the target ports presented to the host by the first and second storage controllers.

Promoting discovery of migration-target volume using the discoverable paths may include one or both of the first storage controller and the second storage controller presenting target port group information to hosts about the migration-source volume and/or the migration-target volume.

Using differentiated target port descriptors to define different discoverable paths to the migration-source volume and the migration-target volume may include coordinating between the first and second storage controllers so that the migration-source volume and the migration-target volume identify target port groups and relative port identifiers that do not clash.

Using differentiated target port descriptors to define different discoverable paths to the migration-source volume and the migration-target volume may include setting a system differentiator parameter associated with the migration-target volume as an inverse of a system differentiator parameter associated with the migration-source volume.

The method may include configuring the migration replication relationship including associating metadata with the migration-target volume to indicate that it is a migration target to allow recovery if the data migration is interrupted.

Configuring metadata of the migration-target volume to present the migration-source volume and the migration-target volume as a same volume to a host may include replacing some of the metadata associated with the migration-target volume with a copy of the metadata associated with the migration-source volume.

According to a further aspect of the present invention there is provided a system for non-disruptive volume migration between storage controllers, including a processor and a memory configured to provide computer program instructions to the processor to execute the function of the components of a volume migration system including a migration relationship configuration component for creating a migration replication relationship for data migration between a migration-source volume on a first storage controller and a migration-target volume on a second storage controller, where a volume represents a virtualized device, a path discovery component for presenting the migration-source volume and the migration-target volume as a same volume to a host whilst using differentiated target port descriptors to define different discoverable paths to the migration-source volume and the migration-target volume, a target port access component for, during the data migration, allowing input/output operations to the migration-source volume by presenting target ports of the first storage controller in an available state and deterring input/output operations to the migration-target volume by presenting target ports on the second storage controller in a standby state whilst allowing host discovery of paths to the migration-target volume, and an access switching component for, once the data migration is complete switching target port states to allow input/output operations to the migration-target volume and to deter input/output operations to the migration-source volume.

The target port access component may include an input/output failing component for failing any received input/output operations at the migration-target volume.

The access switching component may include a data migration completion component for prompting automatically switching target port states on detecting or receiving confirmation of completion of the data migration.

The system may include an attention raising component for raising an asymmetric access state changed unit attention to a host to alert the host to changes to the states that result in a switch of input/output operations from the migration-source volume to the migration-target volume.

The access switching component for deterring input/output operations to the migration-source volume once the data migration is complete may include switching ports on the first storage controller to a standby state or removing paths to the migration-source volume on detecting or receiving confirmation that the migration is successful.

According to a further aspect of the present invention there is provided a system for non-disruptive volume migration between storage controllers, including a processor and a memory configured to provide computer program instructions to the processor to execute the function of the components of a migration system including a migration relationship configuration component for creating a migration replication relationship for data migration between a migration-source volume on a first storage controller and a migration-target volume on a second storage controller, wherein a volume represents a virtualized device, a metadata configuring component for configuring metadata of the migration-target volume to present the migration-source volume and the migration-target volume as a same volume to a host whilst using differentiated target port descriptors to define different discoverable paths to the migration-source volume and the migration-target volume, a path discovery component for promoting discovery of migration-target volume using the discoverable paths, and a coordinating component for coordinating input/output operation access during the data migration using asymmetric access states for the target ports presented to the host by the first and second storage controllers.

The path discovery component for promoting discovery of migration-target volume using the discoverable paths may include one or both of the first storage controller and second storage controller presenting target port group information to hosts relating to the migration-source volume and/or the migration-target volume.

The system may include a recovery indicator component for associating metadata with the migration-target volume to indicate that it is a migration target to allow recovery if the data migration is interrupted.

The migration system may be formed of components on each of the first and second storage controllers with messaging between the components to coordinate the volume access during the data migration.

According to a further aspect of the present invention there is provided a computer program product for non-disruptive volume migration between storage controllers, the computer program product including a computer readable storage medium having program instructions embodied therewith, the program instructions executable by a processor to cause the processor to: create a migration replication relationship for data migration between a migration-source volume on a first storage controller and a migration-target volume on a second storage controller, where a volume represents a virtualized device, present the migration-source volume and the migration-target volume as a same volume to a host whilst using differentiated target port descriptors to define different discoverable paths to the migration-source volume and the migration-target volume, during the data migration, allow input/output operations to the migration-source volume by presenting target ports of the first storage controller in an available state and deter input/output operations to the migration-target volume by presenting target ports on the second storage controller in a standby state whilst allowing host discovery of paths to the migration-target volume, and once the data migration is complete, switch target port states to allow input/output operations to the migration-target volume and to deter input/output operations to the migration-source volume.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

A non-disruptive volume migration between two storage controllers is provided by creating a migration replication relationship to manage a relationship between a migration-source volume at a first storage controller and a migration-target volume at a second storage controller such that both volumes are presented to hosts as a single volume. This allows a user to migrate a virtualized disk from one storage controller to another storage controller while maintaining host operations to that virtualized disk throughout the migration.

During a migration phase in which data is copied from a migration-source volume to a migration-target volume, hosts are allowed to discover migration-target volumes whilst the second storage controller prevents input/output (I/O) operations to the migration-target volumes by keeping ports in the second storage controller in a standby state.

The I/O operations of the host are switched seamlessly and non-disruptively from the first storage controller to the second storage controller when the migration is complete by changing the port states at the storage controllers. The states of the ports are determined according to Asymmetric Logical Unit Access (ALUA) states. The ALUA states of the ports on the two storage controllers are set based on the completion of the volume migration such that external devices are able to detect the states.

An asymmetric access state changed unit attention is raised to switch the I/O operations of a host seamlessly from a migration-source volume to the migration-target volumes. The ports in the second storage controller are switched from a standby state to an active state, whilst the ports in the first storage controller are switched from an active state to either a standby state or access to the volume through the ports is removed.

Figure 1:
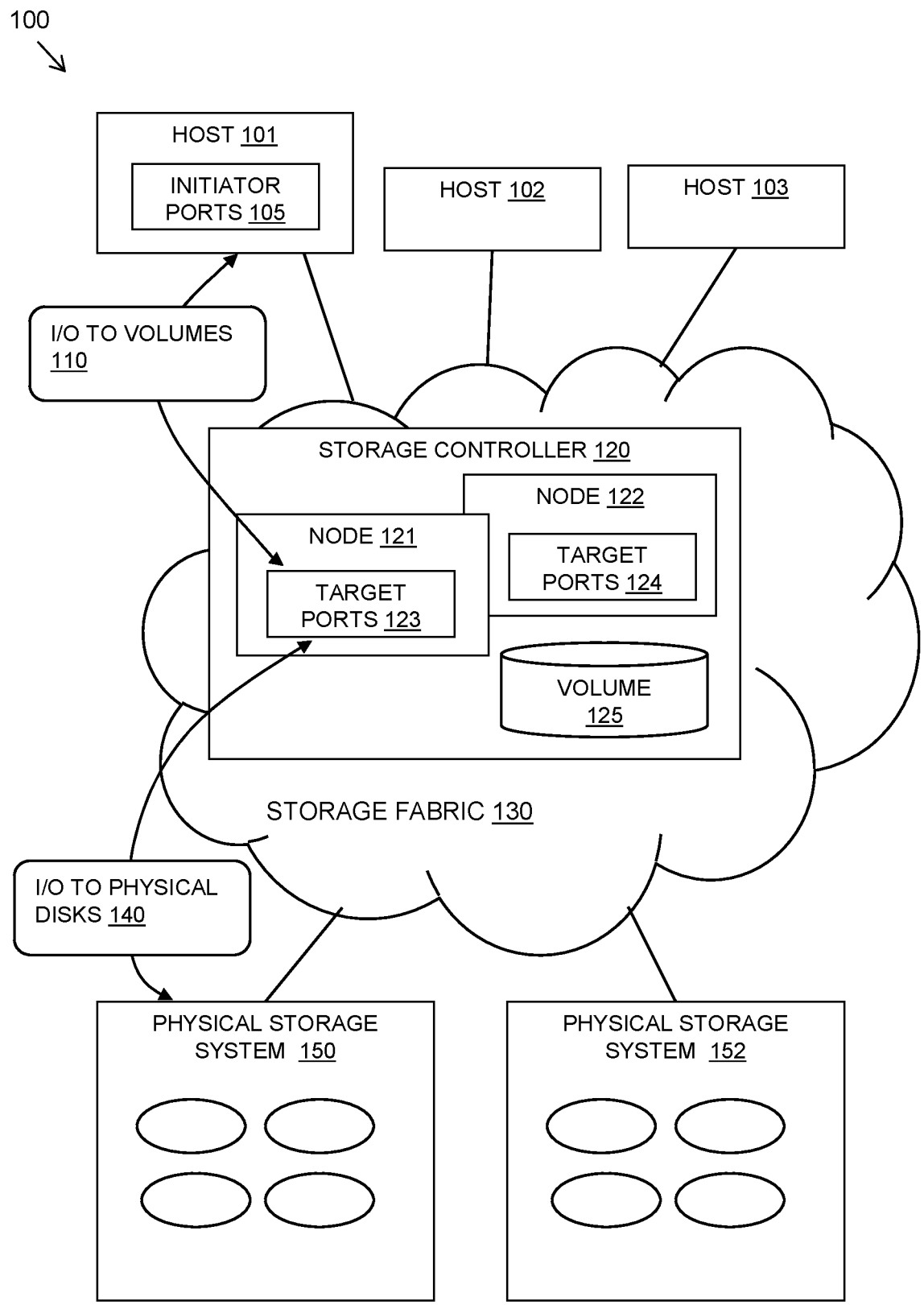
FIG. 1 is a block diagram of an example embodiment of a storage system.

Referring to FIG. 1, a block diagram shows a storage network 100 in which the described method and system may be implemented, according to an embodiment. The storage network 100 includes hosts 101-103 and a storage network that may be provided by a high-speed Fibre Channel or iSCSI network that connects host systems and storage devices with connections being provided through units such as routers and switches provided by a storage fabric 130.

The storage network 100 includes a storage controller 120 that provides flexible storage solutions that enable rapid deployment of block storage services for new and traditional workloads, on-premises, off-premises, in a combination of both including in cloud environments.

Figure 2:
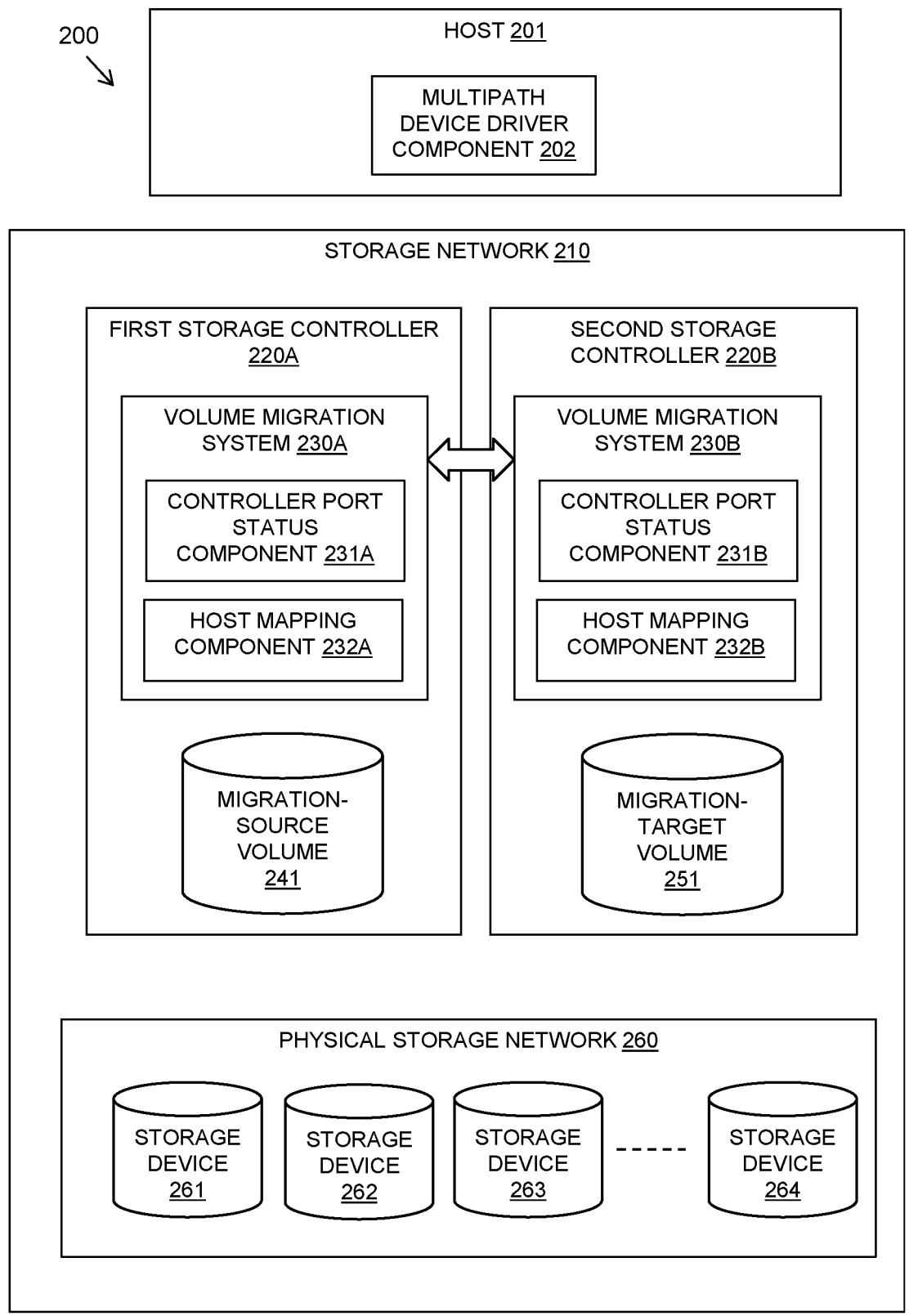
FIG. 2 is a block diagram of an example embodiment of a storage system having two storage controllers in which the present invention may be implemented.

The described method and system may be implemented across two storage controllers 120, as illustrated further with reference to FIG. 2, or more than two storage controllers 120. The two storage controllers 120 may be provided on the same storage network 100 or on two separate storage networks 100, for example, that may be at different sites.

The storage controller 120 provides a block storage virtualization presented to hosts 101-103 in the form of virtualized disks, which the hosts 101-103 discover as managed devices. A storage controller 120 creates a pool of managed devices from physical storage systems 150, 152, with volumes 125 created from the managed devices. The storage controller 120 may present a single point of control for system management and service through one of its nodes that acts as a configuration node.

The storage controller 120 presents the volumes 125 to the hosts 101-103, which use SCSI to talk to the volumes 125. The volumes 125 used in the described method and system are traditional volumes in the form of SCSI target volumes that receive both administrative commands (e.g. INQUIRY) and I/O commands (e.g. types of READ and WRITE).

The storage controller 120 includes multiple nodes 121, 122 for redundancy. For example, the nodes 121, 122 may be arranged into pairs that are known as I/O groups. As the volume 125 is served by two nodes, no loss of availability occurs if one node fails or is taken offline. I/O operations between the hosts 101, 102, 103 and the storage controller's 120 nodes 121, 122 use the SCSI standard. The nodes 121, 122 also communicate with each other through private SCSI commands and/or other internal messaging protocols.

Each node 121, 122 has target ports 123, 124, respectively, that present the volumes 125 to the hosts 101, 102, 103. Paths to a volume 125 are a combination of an initiator port 105 at the host 101 and a target port 123 at the node 121 that provides access to the volume 125. The target ports 123, 124 on each node 121, 122 in a redundancy pair provide access to a given volume 125 with the target ports on the nodes grouped into target port groups with individual node ports being identified as relative ports within the group.

The hosts 101, 102, 103 send I/O operations 110 to volumes 125 at the nodes 121, 122 and the nodes 121, 122 send I/O (input/output) operations 140 to physical disks of the physical storage systems 150, 152.

Asymmetric Logical Unit Access (ALUA), also known as Target Port Groups Support (TPGS), is a set of SCSI concepts and commands that define path prioritization between initiator ports 105 at a host 101 and target ports 123, 124 at a node 121, 122. ALUA is a formalized way to describe SCSI port status, and access characteristics. This standard is designed to define the protocol on how multipath I/O should be managed between hosts and storage devices.

ALUA features of SCSI are used to present states of target port groups to prioritize and coordinate host access to a volume through the nodes, for example, the states may be used to disable the I/O for a node before it is taken offline or when a volume cannot be accessed via that node. This functionality is used in the described method and system to coordinate the I/O operations to a volume being migrated between two storage controllers.

Referring to FIG. 2, a block diagram shows a storage system 200 including a host 201 and a storage network 210 connecting to a physical storage network 260 providing physical storage devices 261-264, according to an embodiment. The storage network 210 includes a first storage controller 220A and a second storage controller 220B. It should be appreciated that the first and second storage controllers 220A, 220B may be provided on two separate physical storage networks 210 at different sites.

A volume migration system 230A, 230B is provided at each storage controller 220A, 220B to provide the described functionality of non-disruptive volume migration between storage controllers 220A, 220B to migrate a virtualized disk whilst maintaining host 201 operations to that virtualized disk. The first storage controller 220A may control the migration-source volume 241 and the second storage controller 220B may control the migration-target volume 251. It will be appreciated that each storage controller 220A, 220B may include the components and functionality to act as both a source and a target of the volume migration.

A volume migration coordination is implemented through the volume migration systems 230A, 230B running in each of the two storage controllers 220A, 220B, coordinated via messages sent between the two storage controllers 220A, 220B.

The volume migration systems 230A, 230B at each storage controller 220A, 220B may include a controller port status component 231A, 231B for controlling port statuses of the first and second storage controllers 220A, 220B. The volume migration system 230A, 230B may also include a host mapping component 232A, 232B for making a volume accessible to the host 201 with target port identifiers for the volume and with the port status.

The host 201 may include a multipathing device driver component 202 that groups available paths with target ports of storage controllers 220A, 220B to a virtual disk device and presents it to an operating system of a host 201. The multipathing device driver component 202 performs port handling and selects the active I/O paths.

Host mapping is the process of controlling which hosts or host clusters have access to specific volumes. The act of mapping a volume to a host makes the volume accessible to host using the WWPNs or iSCSI names such as iSCSI qualified names (IQNs) or extended-unique identifiers (EUIs) that are configured in the host object. Each mapping associates a volume with a host and provides a way for all WWPNs and iSCSI names in the host or host cluster to access the volume. A volume may be mapped to multiple hosts or host clusters.

When a mapping is created, multiple paths might exist across the fabric from the hosts to the nodes that are presenting the volume. The multipathing software manages the many paths that are available to the volume and presents a single storage device to the operating system.

Paths to the volume are any combination of initiator port and target port that provide access to the volume. When a volume is presented to a host using multiple paths, it adds complexity and path discovery uses the ALUA states as a formalized way to describe SCSI port status and access characteristics.

In conventional implementations, in response to a host administrative command, each storage controller only returns target port group descriptors for its own ports. For example, a two node cluster will report two target port group descriptors, one for each of the two nodes in that cluster with all of the ports belonging to a single node being grouped together in the same target port group.

In some embodiments, the described method and system may provide additional communication between the two storage controllers to report target port groups of the nodes accessing the migrating volume of the other storage controller. This enables a host to discover the migration-target volume 251 and to see it as the same volume as the migration-source volume 241 and to coordinate I/O operations to the volumes using the discovered paths and their associated access states.

In other embodiments, each storage controller may only report paths to volumes through its own ports. Some host multipathing drivers can incorporate these separate responses into a complete description of all paths to the volume on each storage controller, which allows this non-disruptive migration to work for those hosts.

In the described method and system, the host 201 discovers the paths by sending administrative commands from its own initiator ports, through target ports on the two different storage controllers 220A, 220B to the volume 241, 251.

Responses are presented by the first and second storage controllers 220A, 220B to administrative commands (such as INQUIRY commands and REPORT TARGET PORT GROUPS commands) from the storage network 210, such that the host's multipathing device driver component 202 groups the migration-source volume 241 of the first storage controller 220A and the migration-source volume 251 of the second storage controller 220B together as a single volume.

The described method and system allow the host 201 to discover new paths to the migration-target volume 251 through target ports on nodes belonging to the second storage controller 220A, while presenting that volume 251 with the same identify as the migration-source volume 241, and using the ALUA states of the respective target port groups to encourage the host 201 to send I/O to the correct storage controller at each stage of the migration.

The described solution is implemented in the storage system and manages the data replication from source to target, for example, using a metro mirror relationship, then presents the migration-target volume 251 to the host 201 as if it were new paths to access exactly the same volume as the migration-source volume 241. No additional application beyond traditional multipathing software is required on the host 201.

Figure 3A:
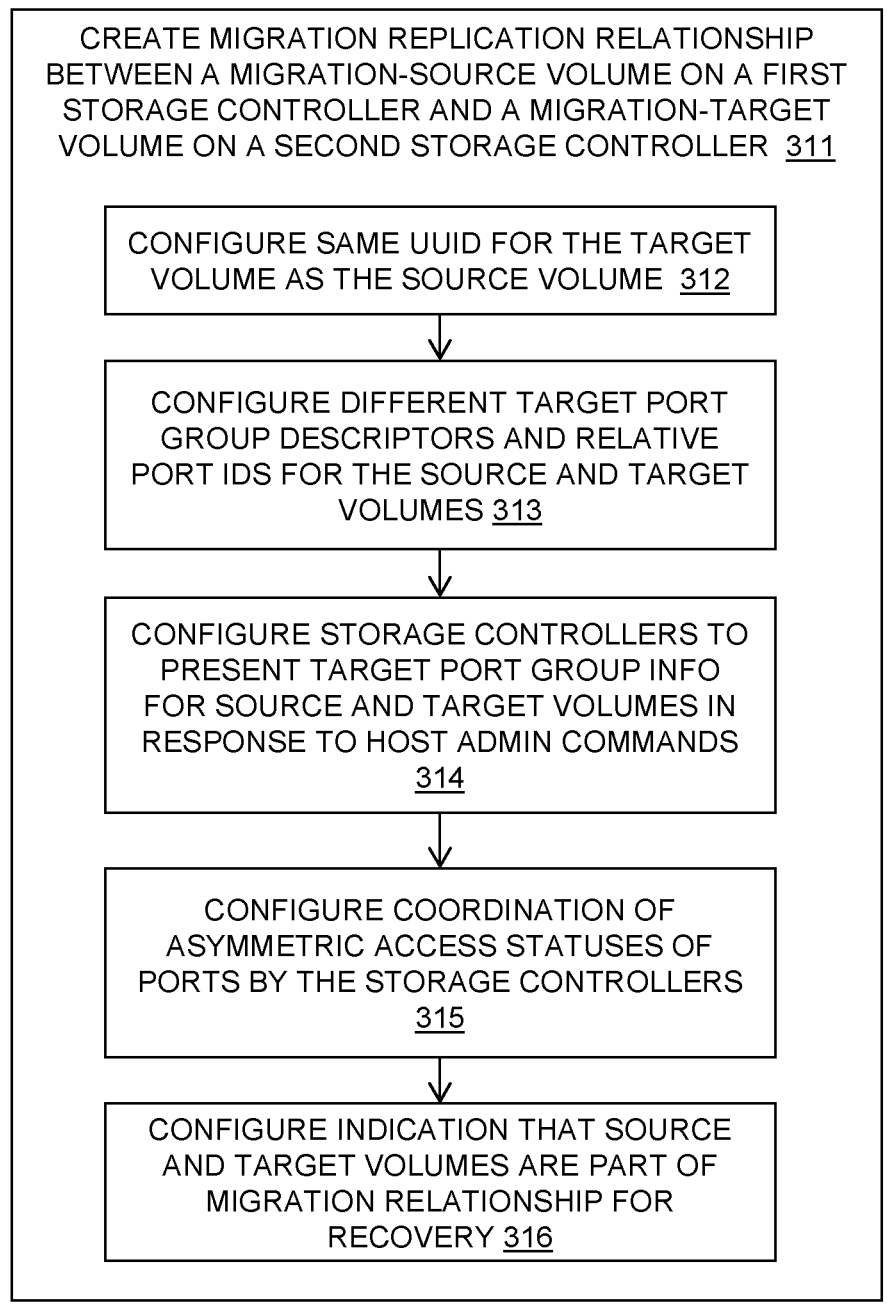
FIGS. 3A and 3B are flow diagrams of an example embodiment of a method in accordance with the present invention.

Referring to FIG. 3A, a flow diagram 310 shows a first stage of an example embodiment of the described method.

The method may create, 311, a migration replication relationship to manage the relationship and migration between a migration-source volume and a migration-target volume on two different storage controllers such that the volumes are presented to hosts as a single volume representing a virtualized disk.

The user may use a command line interface (CLI) or a graphical user interface (GUI) on a first storage system to create any suitable type of replication relationship between a volume on the first storage system and a volume on a second storage system. This causes copying of data to commence such that the two volumes become synchronized. This may include setting up connectivity between the first and second storage systems and identifying the volumes.

In the described method, the relationship is additionally configured as a migration replication relationship to execute the additional described behavior. The configuration as a migration replication relationship includes further actions being carried out between the first and second storage controllers to configure the migration replication relationship. Configuring the migration replication relationship includes sending metadata providing information of the configuration from the first storage controller that has an identified migration-source volume to the second storage controller to configure the migration-target volume.

The configuration includes providing, 312, a same unique universal identifier (UUID) for the migration-source volume and the migration-target volume so that a host recognizes the volumes as a single device. The migration-target volume inherits the UUID from the migration-source volume.

The configured metadata also instructs, 313, the migration-target volume to present different target port group descriptors and relative port identifiers compared to the migration-source volume to allow hosts to accurately discover all paths to the volume via the two storage controllers.

In one embodiment, when the migration relationship is created, a system differentiator parameter associated with the migration-target volume is set to be the inverse of the system differentiator parameter associated with the migration-source volume. At the time the migration relationship is created, this information is transmitted from the first storage controller to the second storage controller to set the value. The value of this system differentiator is used when responding to host administrative commands (such as SCSI Inquiry and SCSI Report Target Port Groups commands), such that the two volumes return different target port group descriptors and different relative target port identifiers. This allows the host to uniquely identify the paths to the volume through target ports on each storage controller.

The first and second storage controllers are configured, 314, to present target port group information to hosts about the migration-source volume and the migration-target volume in response to host commands. This enables the host to group paths together as relating to the single virtualized device. This may be configured in a number of ways.

In one embodiment, each storage controller may present information about only its own target port groups (with co-ordination between the two controllers to avoid clashes between target port group descriptors and relative port IDs, as described), which is acceptable for some host types with host multipathing drivers that accommodate this.

In another embodiment, each storage controller may present information about the target port groups on both storage controllers, which requires additional communication between the storage controllers to pass information about their ports. Each of the two storage controllers then incorporate port group information about the ports on the other storage system into their response to a Report Target Port Groups (RTPG) command from a host. For example, both systems may report four target port groups, two for ports corresponding to the two nodes on the storage controller that received the RTPG, plus two for ports corresponding to the two nodes on the other storage controller.

In a further embodiment, one storage controller may present information about the target port groups on both storage controllers and one storage controller may just present their target port groups.

Configuring the migration replication relationship also instructs, 315, the coordination of port statuses for the volumes presented by the first and second storage controllers so that paths to both the first and second storage controllers are not both in an active state at the same time. The first and second storage controllers are configured to provide asymmetric access states of the target port group descriptors according to the status of the migration in order to allow host discovery of the migration-target volume whilst only allowing I/O to the migration-source volume. Once the migration is complete, a change of asymmetric access states of the target port group descriptors non-disruptively then allows I/O to the migration-target volume.

Configuring the migration replication relationship also provides, 316, metadata to indicate that the volumes are part of a migration replication relationship so that in the case of an error the system can correctly recover.

A response from either of the storage controllers to a RTPG command from the host returns the following information:

multiple target port group descriptors, each of which has an Asymmetric Access State indicating how the use of that target port group should be prioritized;

a target port group field that identifies the group in question; and multiple target port descriptors describing the ports within that target port group with each port identified by a relative target port identifier.

Once configured, the migration relationship ensures that the target port group and relative port IDs on one storage controller are different to those on the other storage controller and that one of the two volumes reports all of its target port groups as in "Standby" Asymmetric Access State.

Figure 3B:
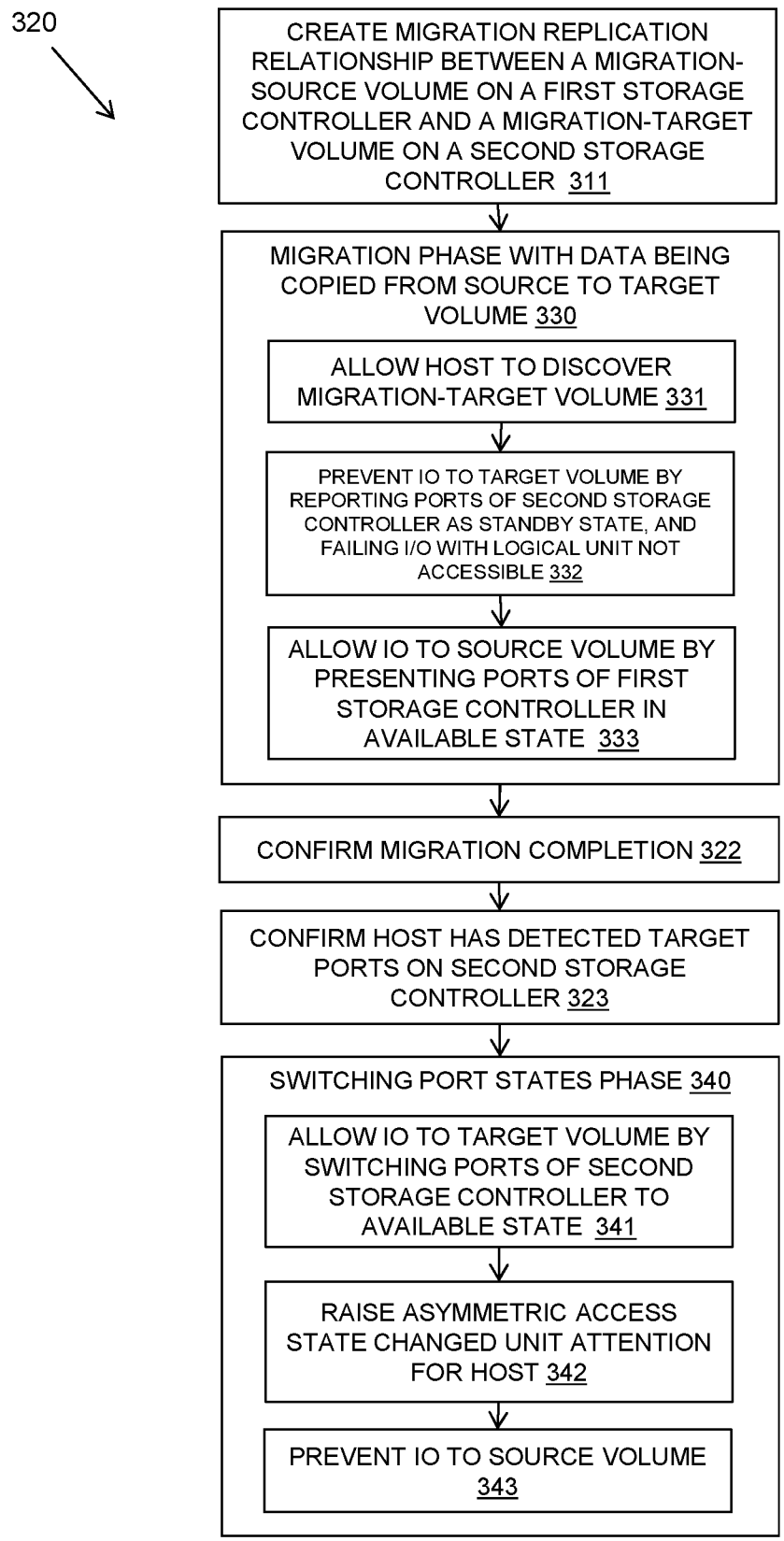

Referring to FIG. 3B, a flow diagram 320 shows further details of the example embodiment of the described method. Once the migration replication relationship has been created 311 and configured as described in relation to FIG. 3A, the migration is started.

A migration phase, 330, is provided whilst migration of data is taking place and data is being copied from the migration-source volume on the first storage controller to the migration-target volume on the second storage controller.

The method includes allowing, 331, the host to discover the migration-target volume. The user may use the CLI or GUI to create a mapping to the migration-target volume on the second storage system. This may be a user action or it may be automated. This allows paths to the migration-target volume to be discovered by the host. The user may run device discovery on their host, which will detect the new paths to the volume. As the migration-target volume is presented with the same UUID but different relative port IDs and target port group descriptors, the multipathing software on the host groups these new paths to the same volume together with the existing paths to the migration-source volume on the first storage system as a single device. This discovery may take place whilst the migration phase, 330, is being carried out.

During the migration phase, 330, ports of the storage controllers present paths to the volume to hosts with an Asymmetric Logical Unit Access (ALUA) states. A standby state may be an ALUA Standby state and an available state may be an ALUA Optimized Active state or Non-Optimized Active state.

The method in the migration phase, 330, prevents 332 I/O operations from the hosts to the migration-target volume by reporting ports on the second storage controller as in a standby state and failing I/O with logical units not accessible and target ports in Standby state. During the migration phase 330, the method allows 333 I/O operations from hosts to the migration-source volume by reporting ports on the first storage controller in an available state.

The method may confirm, 322, when the migration is complete by automatically detecting this or by receiving confirmation of the completion from a user. The method may also confirm, 323, by detection or by receiving confirmation that a host has detected the ports on the second storage controller before switching port states.

The replication relationship may switch automatically on detecting that the copy has completed and that the host is logged in on the second storage controller. Alternatively, the replication relationship may switch in response to a user generated prompt.

When the migration of data is complete, a switching port states phase, 340, may take place by switching to reporting ports of the second storage controller in an available state to allow, 341, I/O operations to the migration-target volume. The method may raise, 342, an asymmetric access state changed unit attention to hosts to switch I/O operations of a host from the migration-source volume to the migration-target volume. The method may prevent, 343, I/O operations to the migration-source volume by reporting ports of the first storage controller in a standby state or by removing access to the volume through ports of the first storage controller.

Removing access to the volume through the ports may be deletion of the volume or removal of the volume-host mapping on the first controller. This does not happen immediately, as the host is intended to see the Asymmetric Access State Changed unit attention on the paths to the first storage controller (immediately after it changes to Standby state). This may happen as soon as these unit attentions have been seen by the host.

In this way, when the migration is complete, the method changes ALUA states and raises an Asymmetric Access State Changed unit attention to seamlessly switch host I/O from the migration-source volume to the migration-target volume, switching host I/O from the first storage controller to the second storage controller non-disruptively.

A host may be automatically unmapped from the migration-source volume and the migration-source volume may be automatically removed on detecting that the migration is successful. Preventing I/O operations to the first storage controller may include automatically removing the migration-source volume on detecting or receiving confirmation that the migration is successful. The method may automatically un-map hosts from the migration-source volume on detecting or receiving confirmation of completion of the data migration.

The method provides a replication relationship that copies data from a first volume on a first storage controller to a second volume on a second storage controller, while presenting both volumes to a host as if they are the same volume. The described method couples the replication state of a volume that determines which copy is host-writeable with an availability state that determines which copy the host attempts to write to. This allows the method to reverse the direction of the replication relationship while the volume remains consistent from the host's perspective. If volumes are in a consistency group, reversal of the replication relationship may change the states of all volumes in the consistency group at the same time.

While the copying is taking place, the ALUA state of the port groups on the two controllers promotes the host to send I/O only through ports on the first storage controller, while refusing I/O sent through ports on the second storage controller. When the copy completes and the direction of the replication relationship switches, the ALUA states of the port groups will switch to promote the host to send I/O only through ports on the second storage controller.

The method prevents I/O to the migration-target volume on a separate system until the synchronization is complete. The use of the standby ALUA state allows the host to discover paths to this volume during migration, while indicating that they should not be used for I/O. Any I/O sent to the migration-target volume will be failed until the direction of the replication migration relationship is switched.

Swapping the ALUA states of the two systems and the use of an Asymmetric Access State Changed Unit Attention allows host I/O to be redirected in a single step, without interruption to applications running on the host. At the point of swapping the ALUA states, the method does not require additional host binding actions.

Figure 4:
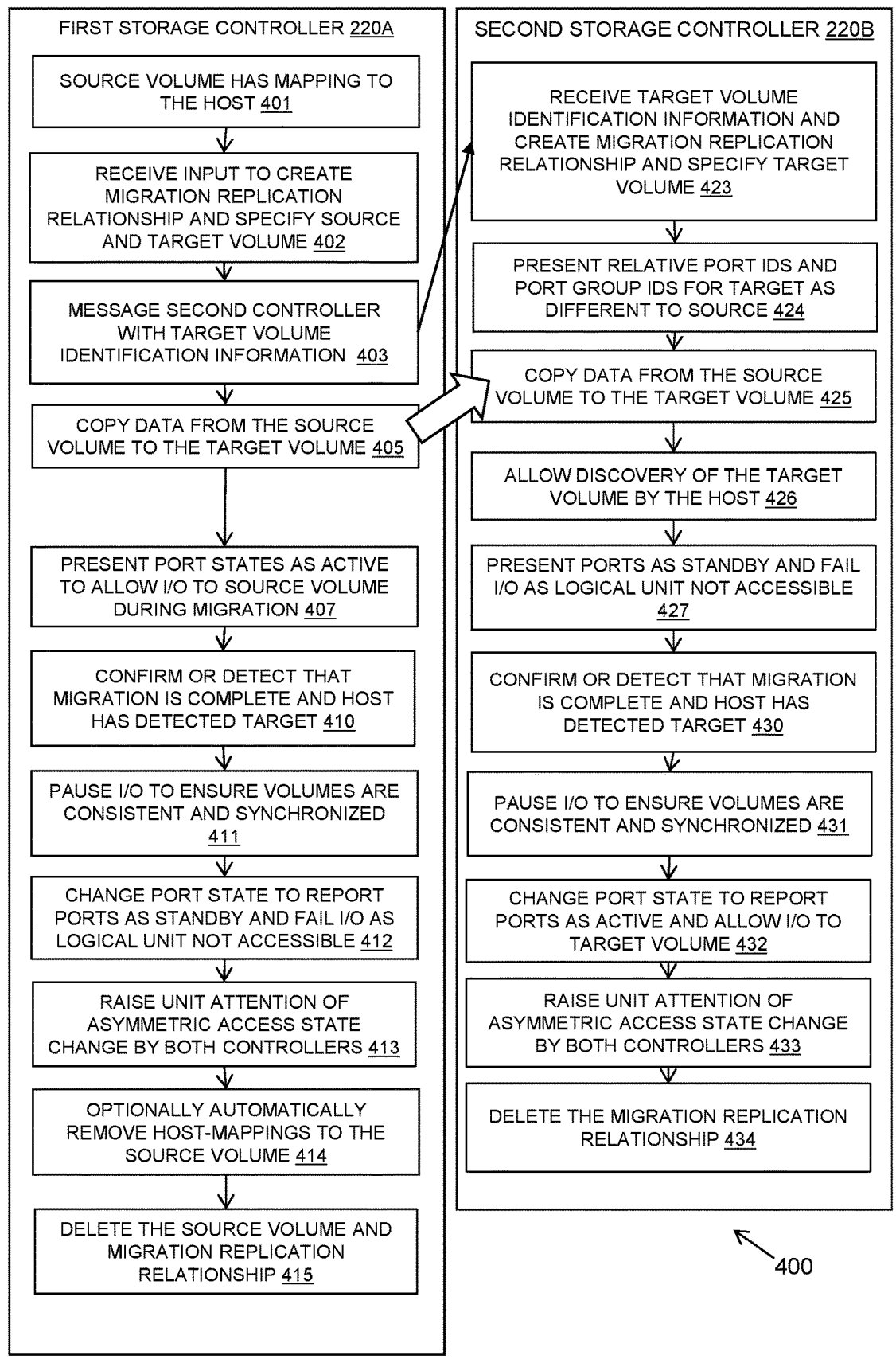
FIG. 4 is a flow diagram of another example embodiment of a method in accordance with the present invention.

Referring to FIG. 4, a flow diagram 400 shows a more detailed example embodiment of the described method as carried out on the first and second storage controllers 220A, 220B, according to an embodiment. Some of the method steps may be carried out simultaneously or in a different order to that shown in FIG. 4.

The first storage controller 220A has a mapping, 401, to the host allowing I/O to the migration-source volume. An input is received, 402, on either or both the first storage controller 220A or the second storage controller 220B to create a migration replication relationship between a first volume on a first storage controller and a second volume on a second storage controller. It may be common to run ae command line interface only on the first storage controller 220A, with the identity of the migration-target volume on the second storage controller passed in a message.

The migration replication relationship results in the two storage controllers 220A, 220B being linked in a partnership during the migration of the data. The first storage controller 220A may message, 403, the second storage controller 220B to establish the migration replication relationship specifying the migration-source volume and the second storage controller 220B may receive, 423, the message and specify the migration-target volume.

The establishment of the migration replication relationship through messages, 403, 423, between the storage controllers 220A, 220B may include compatibility checking to ensure both storage controllers and volumes are compatible with the migration relationship implementation. For example, this may ensure that volumes have a same size and that there are no unsupported host mappings. The compatibility checking may also ensure that storage controller administration commands are compatible with this implementation. If the compatibility check fails on either storage controller 220A, 220B, then the migration relationship is prevented.

The establishment of the migration replication relationship may send copied metadata from the migration-source volume to the migration-target volume. Some of the metadata associated with the migration-target volume is replaced by the copy of the metadata associated with the migration-source volume. For example, the Unique Universal Identifier (UUID) of the migration-target volume is replaced with the UUID of the migration-source volume.

The establishment of the migration replication relationship may also send additional metadata to the migration-target volume and to be associated with the migration-target volume. This may include the configuration data as described in FIG. 3A including a system differentiator for the target port group descriptors and a flag to indicate the migration target to allow recovery if the process is interrupted.

The second storage controller 220B presents, 424, port group IDs that are different to the volume on the first storage controller 220A, so that the port group IDs do not clash based on the metadata provided during configuration. Each of the two storage controllers 220A, 220B may optionally incorporate port group information about the ports on the other storage controller into its response to a Report Target Port Groups (RTPG) command from a host.

The method then copies, 405, 425, data from the migration-source volume (which may be referred to as the master) to the migration-target volume (which may be referred to as the auxiliary) using existing replication relationship techniques.

New user mapping of the migration-target volume to hosts using existing host-volume mapping techniques allow the discovery, 426, of the migration-target volume may be driven from the hosts. The migration-source volume already has host mappings which have been used for I/O on the first storage controller 220A. As the user is now migrating this volume to a second storage controller 220B, once the migration-target volume is created and the migration replication relationship established, new host mappings are set up to the migration-target volume on the second storage controller 220B. Once the user has created host-volume mappings on the second storage controller 220B, discovery may be carried out as a manual or automated step prompted on the host.

During the data migration, the first storage controller 220A presents port states, 407, to allow I/O to the migration-source volume. The first storage controller 220A may present paths to the migration-source with ALUA state of Active/Optimized (AO) or Active/Non-Optimized (ANO).

During the data migration, the second storage controller 220B presents port states, 427, to prevent I/O to the migration-target volume. When an I/O is received by the migration-target volume, the second storage controller responds with a status code indicating that the volume is standby. For example, the second storage controller 220B may present paths to the migration-target volume with ALUA states of Standby (SB). Additionally, any commands that are received fail. The second storage controller 220B fails any I/O that are received as the logical unit is not accessible.

The use of the first storage controller 220A is therefore promoted by setting the Asymmetric Access States of the target port group descriptors in response to a Report Target Port Groups command. The port groups on the second storage controller 220B are presented in standby state, while the port groups on the first storage controller 220A remain in one of two active states (Active/Optimized for the preferred node for the volume, and Active/Non-optimized for the non-preferred node). ALUA-compliant hosts will send a RTPG command to detect these states, and route I/O through ports that are in the Active/Optimized port group. However, a host may still attempt to send I/O to the second storage controller 220B, so the I/O to the second storage controller 220B are prohibited by failing any I/O that is received on the second storage controller 220B with a checking status, for example: 'Check Condition', sense key: 'Not Ready', additional sense code: 'Logical Unit Not Accessible, Target Port In Standby State'.

When the migration is complete with the migration-target volume being a synchronized copy of the migration-source volume, the user confirms or the method detects, 410, 430, that the migration is complete and the standby paths have been detected by the host. The method may temporarily pause, 411, 431, I/O by the storage controllers 220A, 220B on both systems to ensure that the volumes are consistent.

The direction of the migration replication relationship is switched. The first storage controller 220A changes, 412, its port status to prevents I/O to the migration-source volume. When an I/O is received by the migration-source volume, the first storage controller 220A responds with a status code indicating that the volume is on standby. For example, the first storage controller 220A may present paths to the migration-source volume with ALUA states of Standby (SB). The second storage controller 220B at the same time changes, 432, its port status to allow I/O to the migration-target volume. For example, the second storage controller 220B may present paths to the migration-target volume with ALUA state of Active/Optimized (AO) or Active/Non-Optimized (ANO).

Both storage controllers 220A, 220B raise, 413, 433, a Unit Attention to indicate Asymmetric Access State Changed, to prompt hosts to discover the new ALUA states to both volumes.

The value in reporting the standby paths to the migration-target volume is to allow the host to discover these paths before the direction of the replication relationship is switched, so that the host will immediately start using these paths at the time of the switch. This is what results in the non-disruptive nature of the migration as the host I/O is not interrupted.

If this is successful (which can be detected by I/O commencing on the second storage controller 220B), the host does not necessarily ever need to switch back to the first storage controller 220A. Paths to the migration-source volume may therefore be automatically removed, 414, once I/O has commenced on the second storage controller 220B.

The migration-source volume and the migration replication relationship may be deleted, 415, at the first storage controller 220A and the migration replication relationship may be deleted, 434, at the second storage controller 220B.

Figure 5:
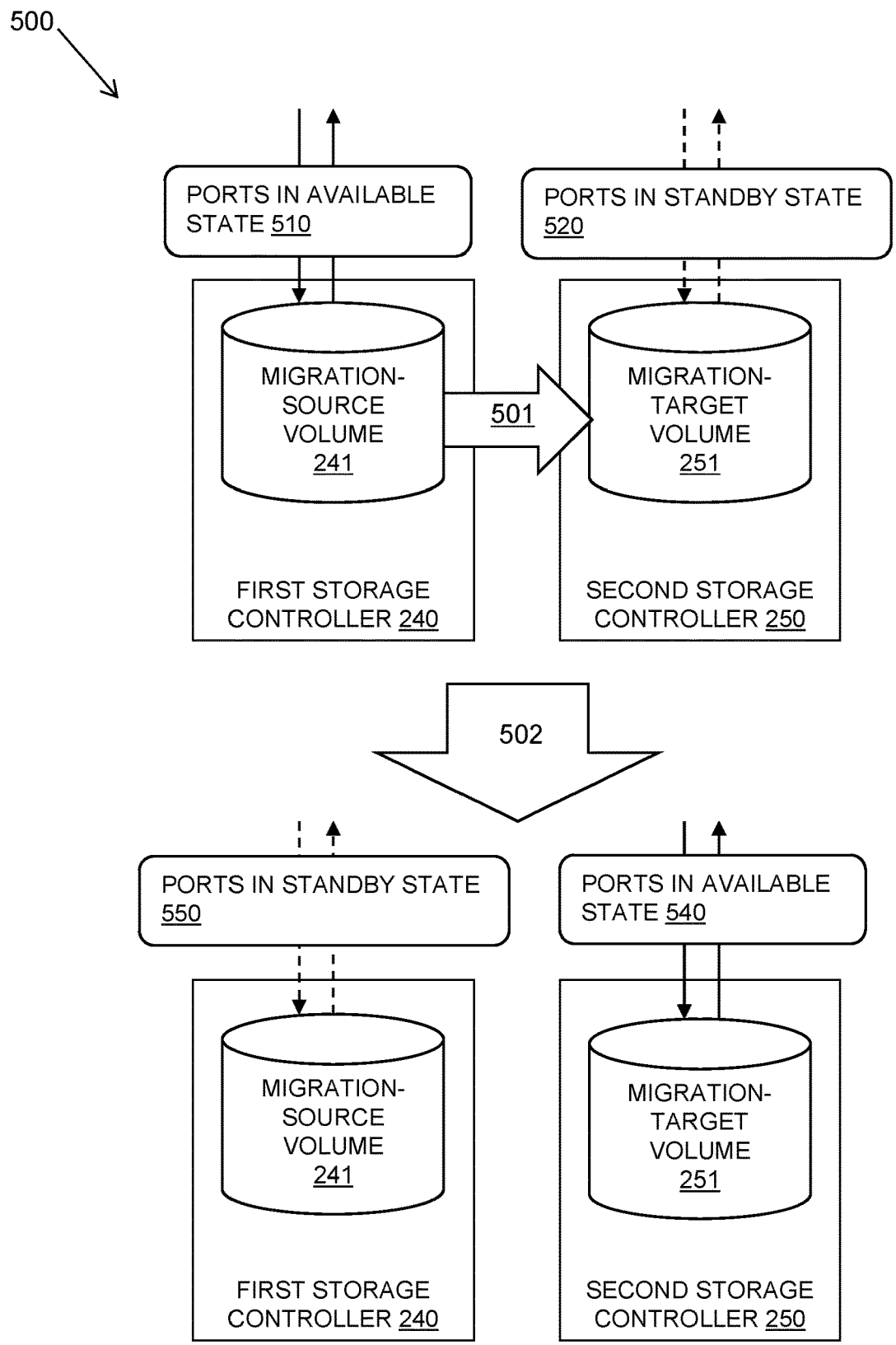
FIG. 5 is a schematic diagram illustrating a method in accordance with the present invention.

Referring to FIG. 5, a schematic diagram 500 illustrates the described method. During a migration phase during which data is migrated 501 from a migration-source volume 241 at a first storage controller 240 to a migration-target volume 251 at a second storage controller 250, the ports to the migration-source volume 241 are in an available state 510 and the ports to the migration-target volume 251 are in a standby state 520 allowing the host to discover the migration-target volume 251.

Once the migration is complete 502, the ports of the migration-target volume 251 are switched to an available state 540 and the ports to the migration-source volume 241 are switched to standby state 550. The standby paths may remain on the first storage controller at least long enough for the host to see the Asymmetric Access State Changed Unit Attention on those paths, after which the use may remove the volume mappings or delete the volume on the original system.

Figure 6:
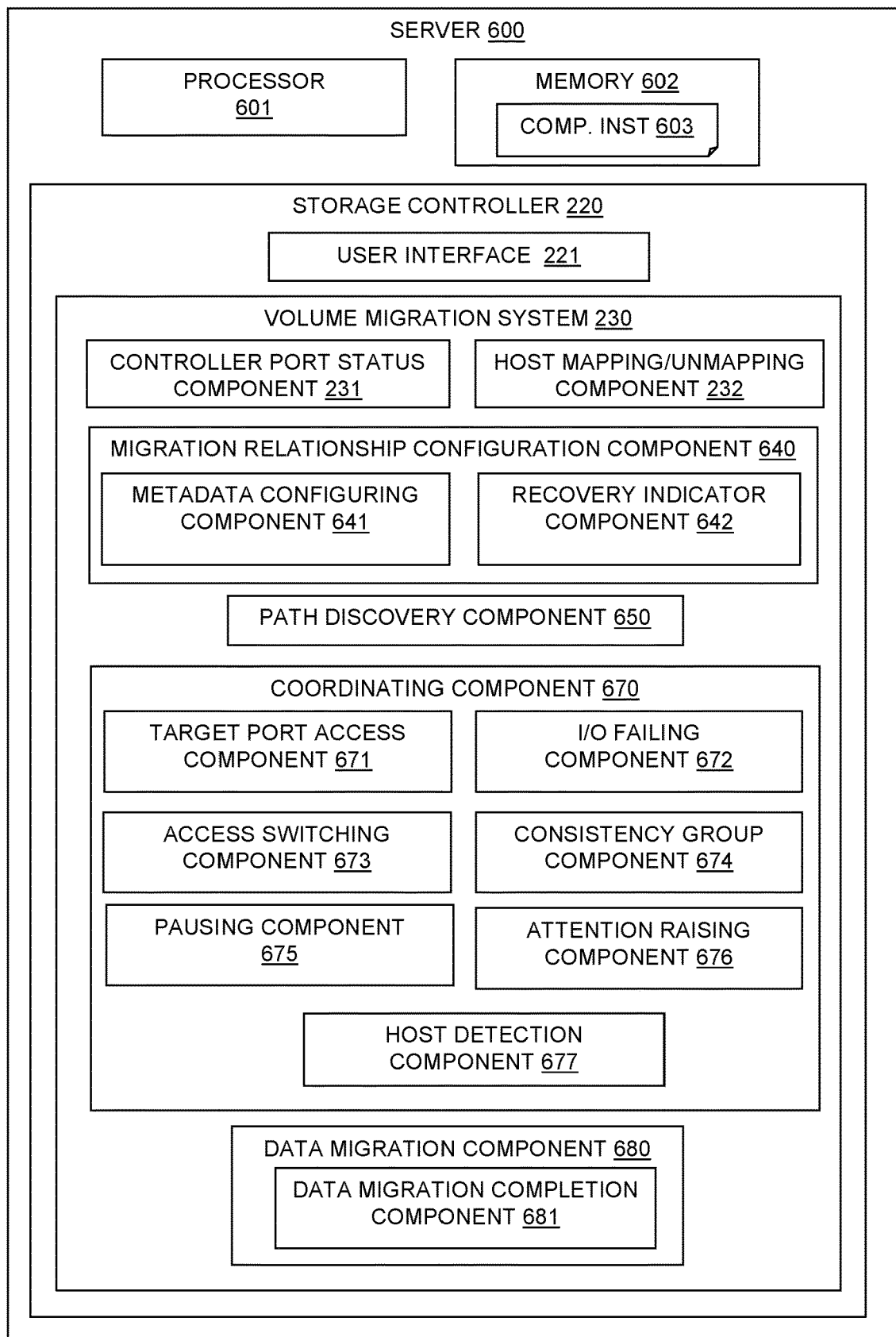
FIG. 6 is block diagram of an example embodiment of a server of a storage controller in accordance with the present invention.

FIG. 6 shows a block diagram of a server 600 at which a storage controller 220 may be implemented, according to an embodiment.

The server 600 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

A volume migration system 230 is provided at the storage controller 220 for coordinating and configuring a volume migration between the storage controller 220 and another storage controller, which may be provided at another server. The storage controller 220 may include functionality to act as a storage controller having the migration-source volume and a storage controller having the migration-target volume. The volume migration system 230 is formed of components on each of the first and second storage controllers with messaging between the components to coordinate the volume migration and volume access during the data migration. The storage controller 220 may include a user interface 221 for receiving user commands for the volume migration system 230.

The volume migration system 230 may include a controller port status component 231 for presenting target port status to a host and a host mapping/unmapping component 232 for mapping ports to a host as described in relation to FIG. 2. The host mapping/unmapping component 232 may automatically unmap hosts from the migration-source volume on detecting or receiving confirmation of completion of the data migration.

The volume migration system 230 may include a migration relationship configuration component 640 for creating a migration replication relationship for data migration between a migration-source volume and a migration-target volume. The migration relationship configuration component 640 may include a metadata configuring component 641 for configuring metadata to present the migration-source volume and the migration-target volume as a same volume to a host whilst using differentiated target port descriptors (for example, target port group descriptors and relative port identifiers) to define different discoverable paths to the migration-source volume and the migration-target volume. The metadata configuring component 641 may replace some of the metadata associated with the migration-target volume with a copy of the metadata associated with the migration-source volume to share the same UUID of the volume. The migration relationship configuration component 640 may also include a recovery indicator component 642 for associating metadata with the migration-target volume to indicate that it is a migration target to allow recovery if the data migration is interrupted.

The volume migration system 230 may include a path discovery component 650 for promoting discovery of the migration-target volume using discoverable paths, which may include the storage controller 220 presenting target port group information to hosts about both the migration-source volume and the migration-target volume. The path discovery component 650 may present the migration-source volume and the migration-target volume as a same volume to a host whilst using differentiated target port descriptors to define different discoverable paths to the migration-source volume and the migration-target volume.

The volume migration system 230 may include a data migration component 680 for copying data from the migration-source volume to the migration-target volume. This may use known copying services.

The volume migration system 230 may include a coordinating component 670 for coordinating I/O operation access during the data migration using asymmetric access states for the target ports presented to the host by the storage controller 220.

The coordinating component 670 may include a target port access component 671 for, during the data migration, allowing I/O operations to the migration-source volume by presenting target ports of the storage controller in an available state and deterring I/O operations to the migration-target volume by presenting target ports of the storage controller in a standby state whilst allowing host discovery of paths to the migration-target volume. The coordinating component 670 may include an input/output failing component 672 for failing any received input/output operations at the migration-target volume.

The coordinating component 670 may include an access switching component 673 for, once the data migration is complete, switching target port states to allow I/O operations to the migration-target volume and to deter I/O operations to the migration-source volume. The access switching component 673 may include switching ports on the storage controller having the migration-source volume to a standby state or removing paths to the migration-source volume on detecting or receiving confirmation that the migration is successful. The access switching component 673 may coordinate with a data migration completion component 681 of the data migration component 680 for prompting automatically switching target port states on detecting or receiving confirmation of completion of the data migration.

The coordinating component 670 may include an attention raising component 676 for raising an asymmetric access state changed unit attention to a host to note the change to the states that will result in a switch of I/O operations from the migration-source volume to the migration-target volume. The coordinating component 670 may include a host detection component 677 for detecting or receiving confirmation that a host has detected the target ports on the second storage controller before switching port states.

The coordinating component 670 may include a pausing component 675 for, once the data migration is complete, temporarily pausing input/output operations to the volume to ensure that the migration-source volume and the target-source volume are consistent. The coordinating component 670 may include a consistency group component 674 for ensuring switching the target port states switches the state of all volumes in a consistency group at the same time.

Figure 7:
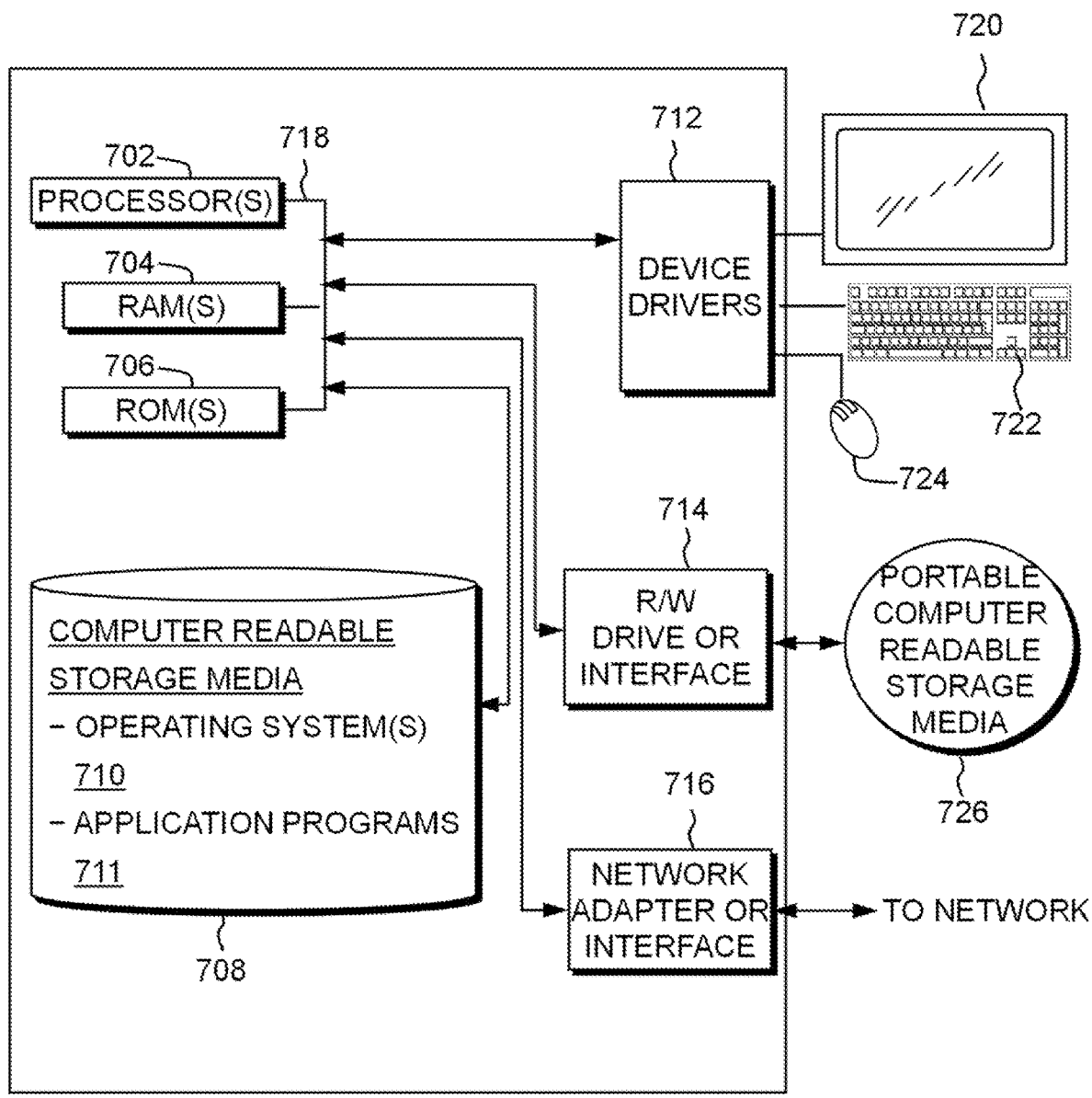
FIG. 7 is a block diagram of an embodiment of a computer system or cloud server in which the present invention may be implemented.

FIG. 7 depicts a block diagram of components of a computing system as used for the server 600, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The computing system can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as the volume migration system 230 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 714 to read from and write to one or more portable computer readable storage media 726. Application programs 711 on the computing system can be stored on one or more of the portable computer readable storage media 726, read via the respective R/W drive or interface 714 and loaded into the respective computer readable storage media 708.

The computing system can also include a network adapter or interface 716, such as a TCP/IP adapter card or wireless communication adapter. Application programs 711 on the computing system can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

The computing system can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
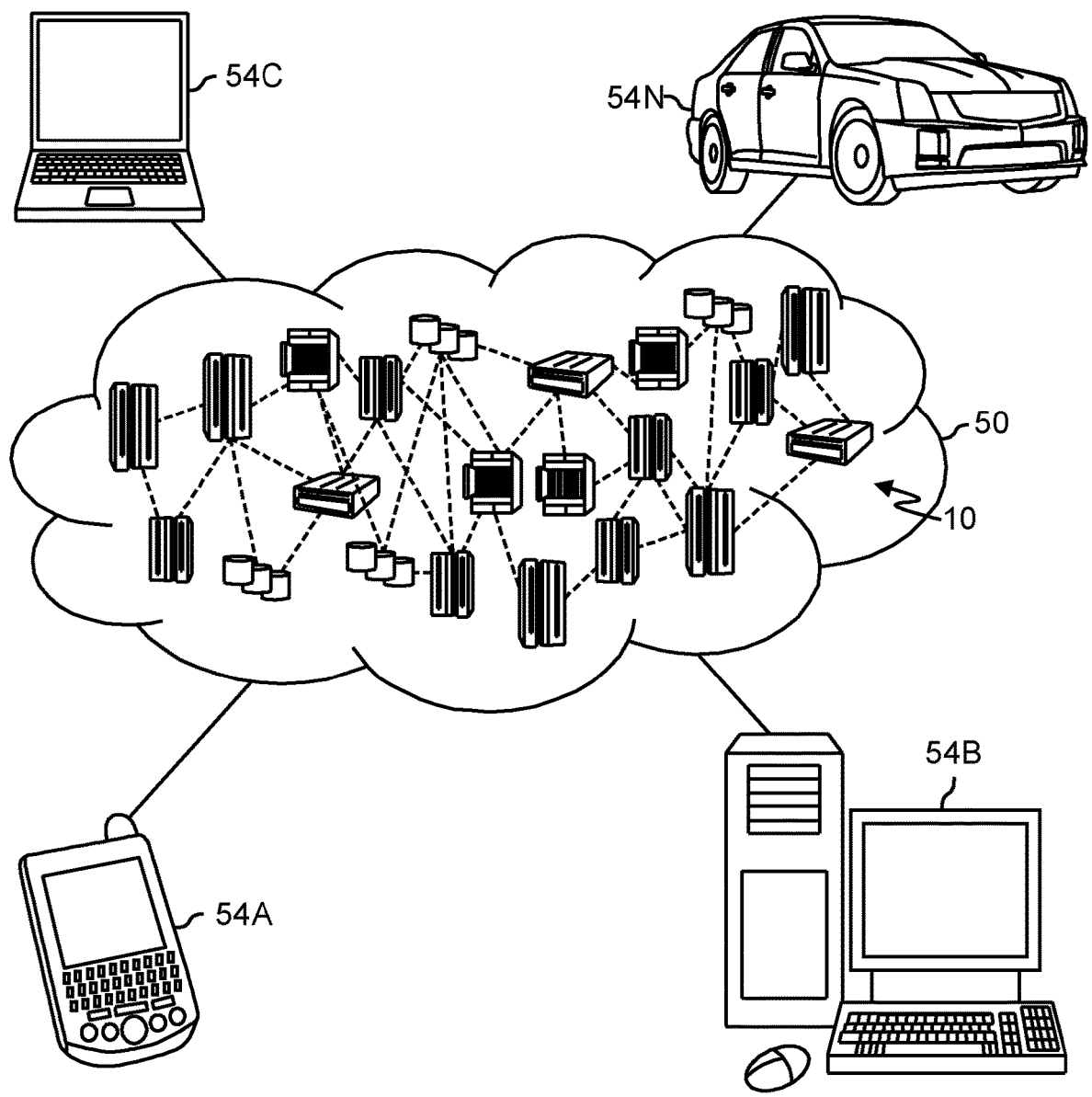
FIG. 8 is a schematic diagram of a cloud computing environment in which the present invention may be implemented.

Referring now to FIG. 8, illustrative cloud computing environment 50 is depicted, according to an embodiment. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
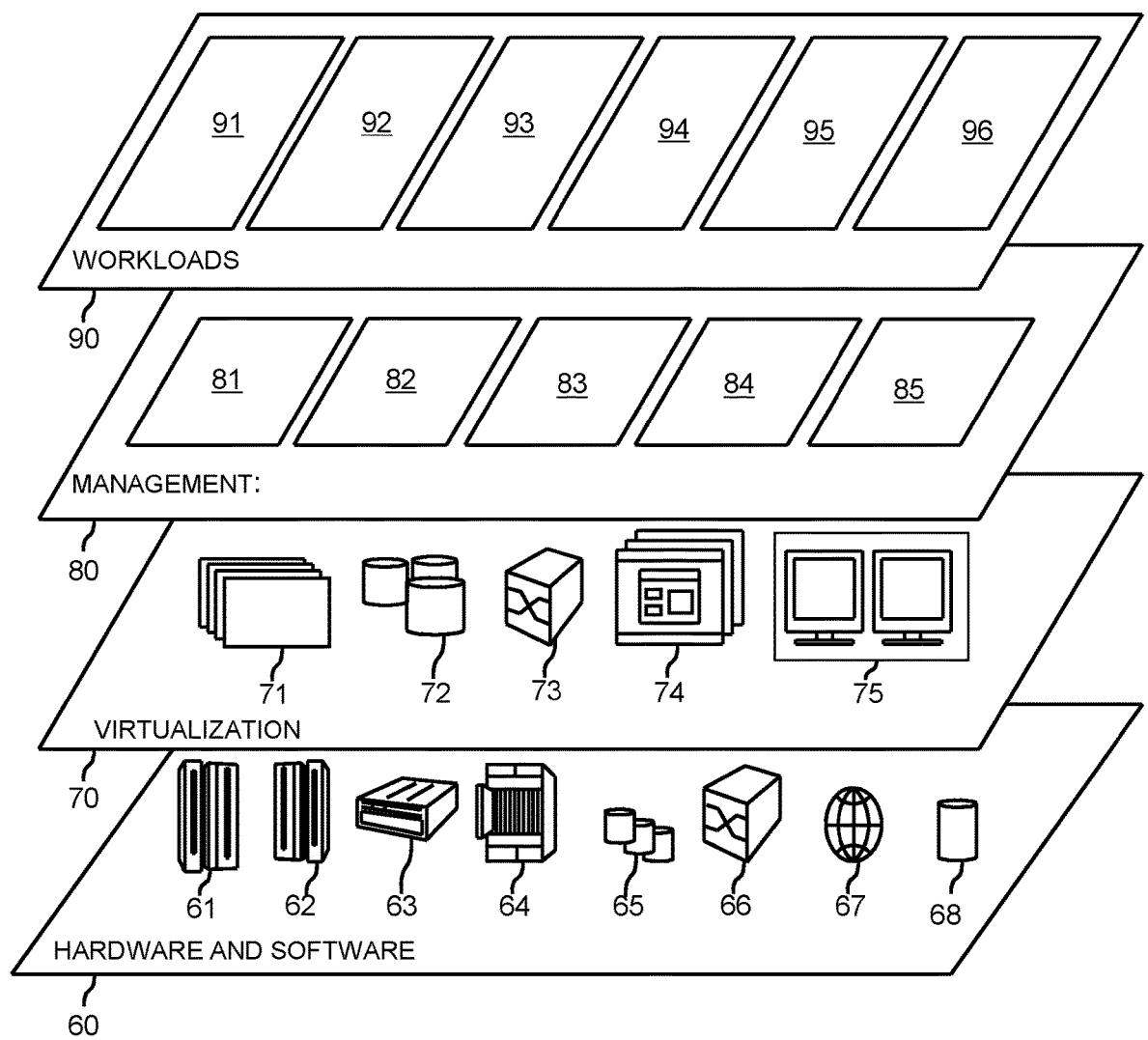
FIG. 9 is a diagram of abstraction model layers of a cloud computing environment in which the present invention may be implemented.

Referring now to FIG. 9, a set of functional abstraction layers provided by cloud computing environment 50 (FIG. 8) is shown, according to an embodiment. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage volume migration processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for non-disruptive volume migration between storage controllers, comprising:
   creating a migration replication relationship for data migration between a migration-source volume on a first storage controller and a migration-target volume on a second storage controller, wherein a volume represents a virtualized device;
   presenting the migration-source volume and the migration-target volume as a same volume to a host whilst using differentiated target port descriptors to define different discoverable paths to the migration-source volume and the migration-target volume;
   during the data migration, allowing input/output operations to the migration-source volume by presenting target ports of the first storage controller in an available state and deterring input/output operations to the migration-target volume by presenting target ports on the second storage controller in a standby state whilst allowing host discovery of paths to the migration-target volume; and
   once the data migration is complete, switching target port states to allow input/output operations to the migration-target volume and to deter input/output operations to the migration-source volume.

2. The computer-implemented method according to 1, wherein creating the migration replication relationship comprises copying a volume identifier from the migration-source volume to the migration-target source volume, such that the migration-target volume and the migration-source volume respond to commands to identify the volumes with the same volume identifier.

3. The computer-implemented method according to 1, wherein creating the migration replication relationship comprises coordinating between the first and second storage controllers so that the migration-source volume and the migration-target volume identify target port groups and relative port identifiers that do not clash.

4. The computer-implemented method according to claim 1, wherein deterring input/output operations to the migration-target volume comprises failing any received input/output operations at the migration-target volume.

5. The computer-implemented method according to claim 1, further comprising:
   detecting or receiving confirmation that the host has detected the target ports on the second storage controller before switching port states; and
   automatically switching target port states on detecting or receiving confirmation of completion of the data migration.

6. The computer-implemented method according to claim 1, further comprising:
   raising an asymmetric access state changed unit attention to a host to alert the host to changes to the states that result in a switch of input/output operations from the migration-source volume to the migration-target volume.

7. The computer-implemented method according to claim 1, further comprising:
   automatically unmapping hosts from the migration-source volume on detecting or receiving confirmation of completion of the data migration.

8. The computer-implemented method according to claim 1, wherein deterring input/output operations to the migration-source volume once the data migration is complete comprises: switching ports on the first storage controller to a standby state or removing paths to the migration-source volume on detecting or receiving confirmation that the data migration is successful.

9. The computer-implemented method according to claim 1, wherein switching the target port states switches the state of the migration-source volume and the migration-target volume in a consistency group at the same time.

10. A computer-implemented method for non-disruptive volume migration between storage controllers, comprising:
    creating a migration replication relationship for data migration between a migration-source volume on a first storage controller and a migration-target volume on a second storage controller, wherein a volume represents a virtualized device;
    configuring metadata of the migration-target volume to present the migration-source volume and the migration-target volume as a same volume to a host whilst using differentiated target port descriptors to define different discoverable paths to the migration-source volume and the migration-target volume;
    promoting discovery of the migration-target volume using the discoverable paths; and
    coordinating input/output operation access during the data migration using asymmetric access states for the target ports presented to the host by the first and second storage controllers.

11. The computer-implemented method according to claim 10, wherein the promoting discovery of migration-target volume using the discoverable paths comprises one or both the first storage controller and the second storage controller presenting target port group information to hosts about the migration-source volume and the migration-target volume.

12. The computer-implemented method according to claim 10, wherein using the differentiated target port descriptors to define different discoverable paths to the migration-source volume and the migration-target volume comprises coordinating between the first and second storage controllers so that the migration-source volume and the migration-target volume identify target port groups and relative port identifiers that do not clash.

13. The computer-implemented method according to claim 10, wherein using differentiated target port descriptors to define different discoverable paths to the migration-source volume and the migration-target volume comprises setting a system differentiator parameter associated with the migration-target volume as an inverse of a system differentiator parameter associated with the migration-source volume.

14. The computer-implemented method according to claim 10, further comprising;
configuring the migration replication relationship comprising associating metadata with the migration-target volume to indicate that it is a migration target to allow recovery if the data migration is interrupted.

15. The computer-implemented method according to claim 10, wherein configuring metadata of the migration-target volume to present the migration-source volume and the migration-target volume as a same volume to the host comprises replacing some of the metadata associated with the migration-target volume with a copy of the metadata associated with the migration-source volume.

16. A system for non-disruptive volume migration between storage controllers, comprising:
one or more computer processors, one or more computer-readable storage media, and program instructions stored on the one or more of the computer-readable storage media for execution by at least one of the one or more processors, wherein the system is capable to execute function of components of a volume migration system comprising:
creating a migration replication relationship for data migration between a migration-source volume on a first storage controller and a migration-target volume on a second storage controller, wherein a volume represents a virtualized device;
presenting the migration-source volume and the migration-target volume as a same volume to a host whilst using differentiated target port descriptors to define different discoverable paths to the migration-source volume and the migration-target volume;
during the data migration, allowing input/output operations to the migration-source volume by presenting target ports of the first storage controller in an available state and deterring input/output operations to the migration-target volume by presenting target ports on the second storage controller in a standby state whilst allowing host discovery of paths to the migration-target volume; and
once the data migration is complete switching target port states to allow input/output operations to the migration-target volume and to deter input/output operations to the migration-source volume.

17. The system according to claim 16, wherein allowing input/output operations comprises an input/output failing component for failing received input/output operations at the migration-target volume.

18. The system according to claim 16, wherein switching target port states comprises a data migration completion component for prompting automatically switching target port states on detecting or receiving confirmation of completion of the data migration.

19. The system according to claim 16, comprising raising an asymmetric access state changed unit attention to the host to alert the host to changes to the states that result in a switch of input/output operations from the migration-source volume to the migration-target volume.

20. The system according to claim 16, wherein switching target port states comprises switching ports on the first storage controller to a standby state or removing paths to the migration-source volume on detecting or receiving confirmation that the volume migration is successful.

21. A system for non-disruptive volume migration between storage controllers, comprising:
one or more computer processors, one or more computer-readable storage media, and program instructions stored on the one or more of the computer-readable storage media for execution by at least one of the one or more processors, wherein the system is capable to execute function of components of a volume migration system comprising:
creating a migration replication relationship for data migration between a migration-source volume on a first storage controller and a migration-target volume on a second storage controller, wherein a volume represents a virtualized device;
configuring metadata of the migration-target volume to present the migration-source volume and the migration-target volume as a same volume to a host whilst using differentiated target port descriptors to define different discoverable paths to the migration-source volume and the migration-target volume;
promoting discovery of migration-target volume using the discoverable paths; and
coordinating input/output operation access during the data migration using asymmetric access states for the target ports presented to the host by the first and second storage controllers.

22. The system according to claim 21, wherein promoting the discovery of migration-target volume using the discoverable paths comprises one or both of the first storage controller and second storage controller presenting target port group information to hosts relating to the migration-source volume and the migration-target volume.

23. The system according to claim 21, further comprising:
associating metadata with the migration-target volume to indicate that it is a migration target to allow recovery if the data migration is interrupted.

24. The system according to in claim 21, wherein creating a migration replication relationship for data migration comprises messaging between components on each of the first and second storage controllers to coordinate the volume access during the data migration.

25. A computer program product for non-disruptive volume migration between storage controllers, the computer program product comprising:
one or more computer-readable storage media and program instructions stored on the one or more computer-readable storage media, the program instructions executable by a computing system to cause the computing system to:
create a migration replication relationship for data migration between a migration-source volume on a first storage controller and a migration-target volume on a second storage controller, wherein a volume represents a virtualized device;
present the migration-source volume and the migration-target volume as a same volume to a host whilst using differentiated target port descriptors to define different discoverable paths to the migration-source volume and the migration-target volume;
during the data migration, allow input/output operations to the migration-source volume by presenting target ports of the first storage controller in an available state and deter input/output operations to the migration-target volume by presenting target ports on the second storage controller in a standby state whilst allowing host discovery of paths to the migration-target volume; and once the data migration is complete, switch target port states to allow input/output operations to the migration-target volume and to deter input/output operations to the migration-source volume.

* * * * *